(No Model.)
W. & R. L. WOODLING.
CORN PLANTER.
No. 413,596. Patented Oct. 22, 1889.
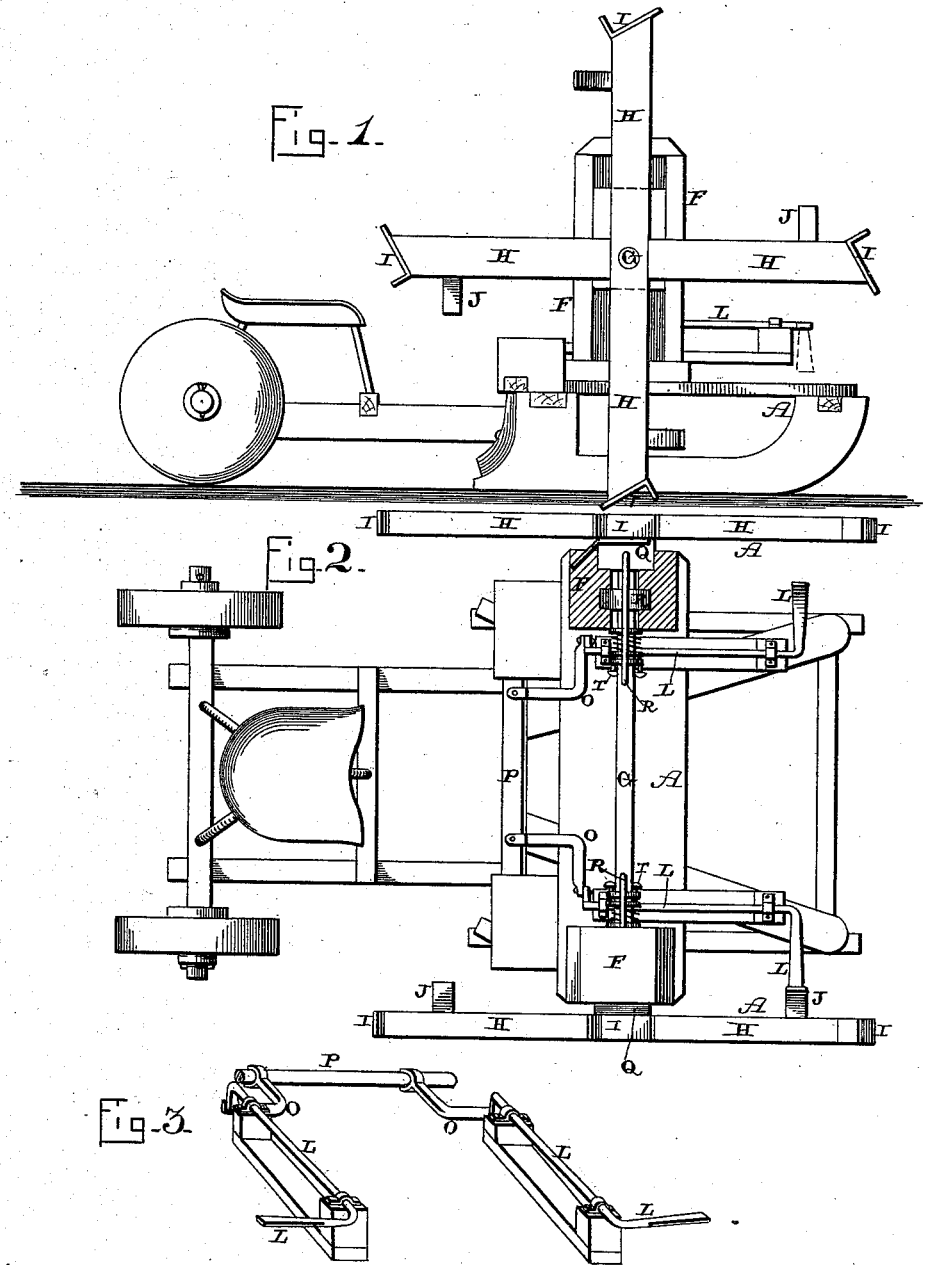

UNITED STATES PATENT OFFICE.

WILLIAM WOODLING AND REASON L. WOODLING, OF LOGANSPORT, INDIANA.

CORN-PLANTER.

SPECIFICATION forming part of Letters Patent No. 413,596, dated October 22, 1889.

Application filed August 10, 1889. Serial No. 320,392. (No model.)

*To all whom it may concern:*

Be it known that we, WILLIAM WOODLING and REASON L. WOODLING, of Logansport, in the county of Cass and State of Indiana, have invented certain new and useful Improvements in Corn-Planters; and we do hereby declare the following to be a full, clear, and exact description of the invention, such as will enable others skilled in the art to which it pertains to make and use it, reference being had to the accompanying drawings, which form part of this specification.

Our invention relates to an improvement in check-row corn-planters; and it consists in, first, the combination of the revolving arms attached to opposite ends of the driving-shaft, sliding boxes in which the shaft is journaled, rollers placed on the shaft, vertical guides in which the boxes and rollers slide, and springs for returning the boxes to position after having been raised; second, the combination of the revolving shaft, the vertically-moving boxes and rollers in which the shaft is journaled, and guides in which the boxes and rollers are placed, with flanges formed upon the axle, and washers and springs placed upon the axle and made to bear against the sides of the guides by means of set-screws.

The object of our invention is to operate the seed-slide by means of revolving arms which have their ends to catch against the ground and cause the shaft to revolve, and thus insure the seed being dropped at regular intervals.

Figure 1 is a side elevation of a corn-planter which embodies our invention. Fig. 2 is a plan view of the same. Figs. 3 and 4 are detached perspectives of the operating parts.

A represents the frame of the corn-planter, and mounted upon the frame A are the guides F, which have openings made through their sides at right angles to the frame A, and passing through these guides F is the revolving shaft G, which has two arms H, placed at right angles to each other, secured to each end. These arms, as the planter is moved forward, have their lower ends to strike against the earth, and thus cause the shaft G to revolve. The ends of these arms H are provided with the shoes I, which are shaped as shown, so as to take a secure hold upon the ground, and at the same time mark the ground just opposite to where a hill of corn is placed.

To one of each of the pair of arms H are secured trip-blocks J, which, as the arms revolve, operate the two levers L, which are journaled upon the top of the frame A and extend straight backward in a line with the direction with which the planter is moving. The outer ends of these levers L are bent at right angles and turned downward and outward, so that as the trip-blocks pass the ends of the levers the levers are alternately operated and made to partially revolve. The blocks upon the arm at the opposite end of the shaft G operate the other levers, the two levers being alternately operated. The rear ends of these levers L are turned downward, as shown in Fig. 3, and are connected to L-shaped attachments O, and these attachments are fastened to the seed-slide P. Each time one of the levers is made to partially revolve the attachment O is made to move the seed-slide P, so as to drop two hills of corn. Placed inside of the guides F are the vertically-moving boxes Q and rollers R, which freely rise and fall inside of the guides, so as to accommodate the arms to the inequalities of the ground.

In order to compel the boxes to quickly return to position and prevent their sticking, springs R are used. These springs are preferably bent as shown, and have their ends turned at right angles, so that one will catch in the under side of the top of the guide, while the other will catch in the top of the box.

In order to prevent the shaft G from having an endwise movement through its guides and bearings, there are two flanges X formed on the shaft inside of the guides, and through these flanges are passed set-screws T, which bear against loose washers V, placed on the shaft next to the flanges. Against the sides of the guides are placed the washers S, and between the two sets of washers are placed the springs Y. By tightening on the set-screws the tension of the springs can be increased to any desired extent necessary to prevent the shaft from moving endwise while the machine is in use. The springs and washers allow one end of the shaft to rise faster than the other when uneven ground is encountered.

Having thus described our invention, we claim—

1. The combination of the frame A, the guides F, mounted thereon, the boxes Q and rollers placed inside of the guides, the shaft G, which passes through the boxes and rollers, the springs for returning the boxes to position, and the arms for causing the shaft to revolve, substantially as described.

2. The combination of the guides, the boxes and rollers placed inside of the guides, the shaft G, provided with the flanges S, the set-screws T, springs Y, and the washers V, substantially as set forth.

In testimony whereof we affix our signatures in presence of two witnesses.

WILLIAM WOODLING.
REASON L. WOODLING.

Witnesses:
BENJ. F. LOUTHAIN,
I. N. CRAWFORD.